(12) United States Patent
Phillips et al.

(10) Patent No.: US 8,976,339 B2
(45) Date of Patent: Mar. 10, 2015

(54) TRAFFIC SCANNING LIDAR

(71) Applicant: Digital Ally, Inc., Lenexa, KS (US)

(72) Inventors: Steven L. Phillips, Olathe, KS (US); Nihat Cem Oguz, Mission, KS (US); Kenneth L. McCoy, Chanute, KS (US); Matthew R. Andrews, Gardner, KS (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

(21) Appl. No.: 14/153,517

(22) Filed: Jan. 13, 2014

(65) Prior Publication Data

US 2014/0125966 A1    May 8, 2014

Related U.S. Application Data

(63) Continuation of application No. 13/085,994, filed on Apr. 13, 2011, now Pat. No. 8,629,977.

(60) Provisional application No. 61/405,805, filed on Oct. 22, 2010, provisional application No. 61/324,083, filed on Apr. 14, 2010.

(51) Int. Cl.
*G01C 3/08* (2006.01)
*G01S 17/42* (2006.01)
*G01S 7/481* (2006.01)
*G01S 17/58* (2006.01)
*G02B 5/09* (2006.01)
*G02B 26/12* (2006.01)

(52) U.S. Cl.
CPC ............. *G01S 17/42* (2013.01); *G01S 7/4813* (2013.01); *G01S 7/4814* (2013.01); *G01S 7/4816* (2013.01); *G01S 7/4817* (2013.01); *G01S 17/58* (2013.01); *G02B 5/09* (2013.01); *G02B 26/12* (2013.01)
USPC ....... 356/4.01; 356/3.01; 356/5.01; 356/5.09; 335/78

(58) Field of Classification Search
CPC ........ G01C 3/08; G01C 15/002; G01C 17/89; G01C 7/4817; G01C 17/42
USPC ......... 356/3.01, 4.01, 4.07, 5.01, 5.09, 9, 625
See application file for complete search history.

(56) References Cited

U.S. PATENT DOCUMENTS

| | | | | |
|---|---|---|---|---|
| 3,896,786 | A * | 7/1975 | Clevett | 126/681 |
| 3,924,105 | A * | 12/1975 | Gassino et al. | 235/462.39 |
| 5,793,491 | A * | 8/1998 | Wangler et al. | 356/613 |
| 6,166,810 | A * | 12/2000 | Nakayama et al. | 356/624 |
| 2002/0159036 | A1 * | 10/2002 | Yamagishi et al. | 353/31 |

* cited by examiner

*Primary Examiner* — Luke Ratcliffe
*Assistant Examiner* — Samantha K Abraham
(74) *Attorney, Agent, or Firm* — Erise IP, P.A.

(57) ABSTRACT

A system for determining the speed and position of objects comprises a beam source, a transmit reflection device, a beam receiver, a receive reflection device, and a controller. The beam source may generate a beam. The transmit reflection device may reflect the beam at the objects and may include a plurality of transmit faces with each transmit face oriented at a different angle and operable to reflect the beam at a different height. The beam receiver may detect the beam. The receive reflection device may include a plurality of receive faces with each receive face oriented at a different angle and operable to focus the beam reflected from objects at different heights onto the beam receiver. The controller may determine the position of the objects over time and calculate the speed of the objects based on a change in the position of the objects.

24 Claims, 13 Drawing Sheets

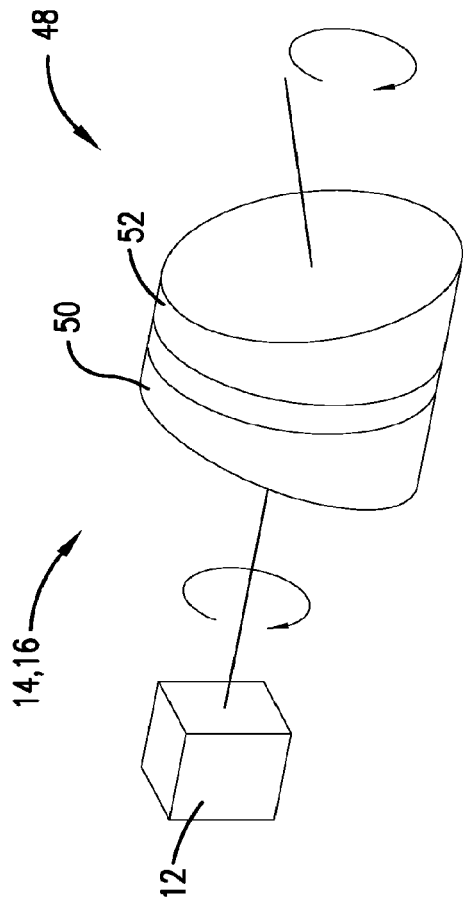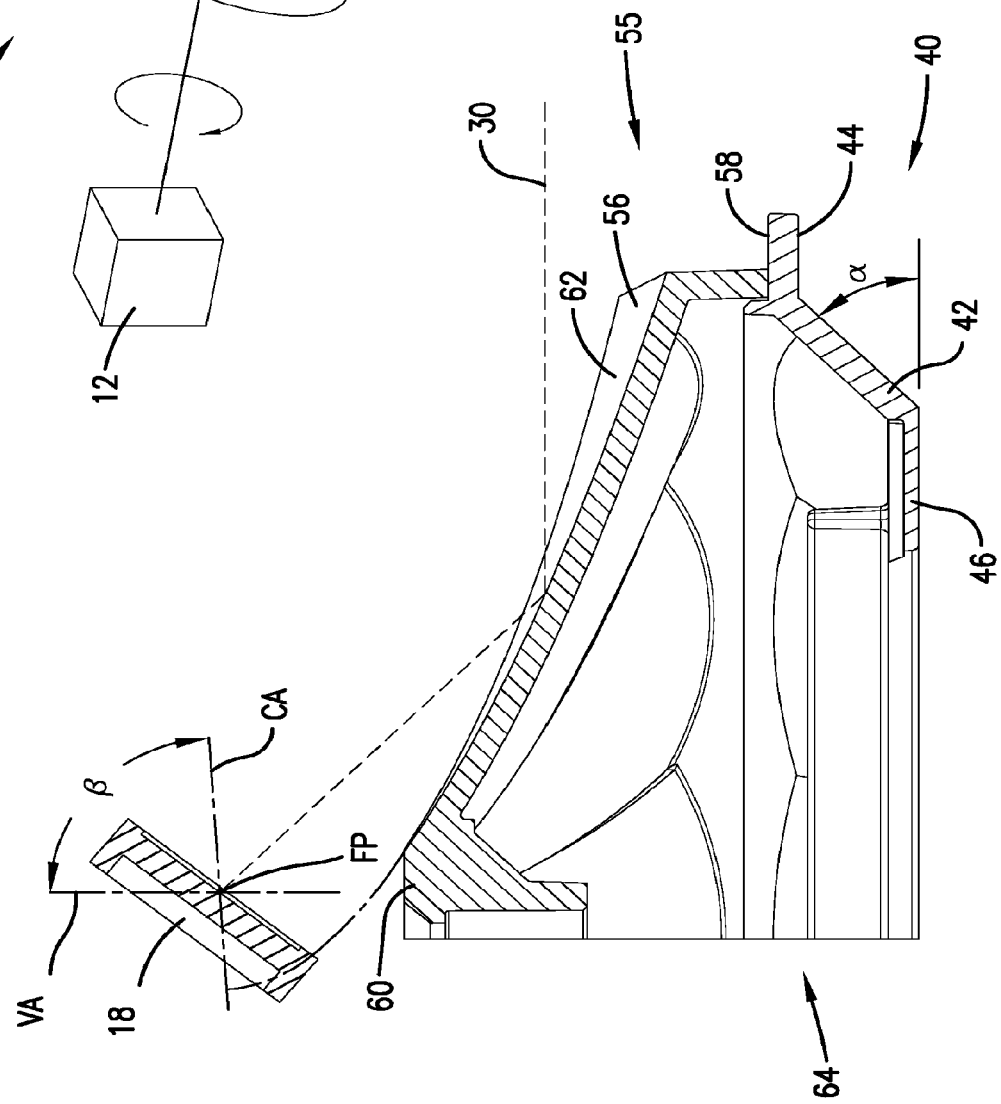

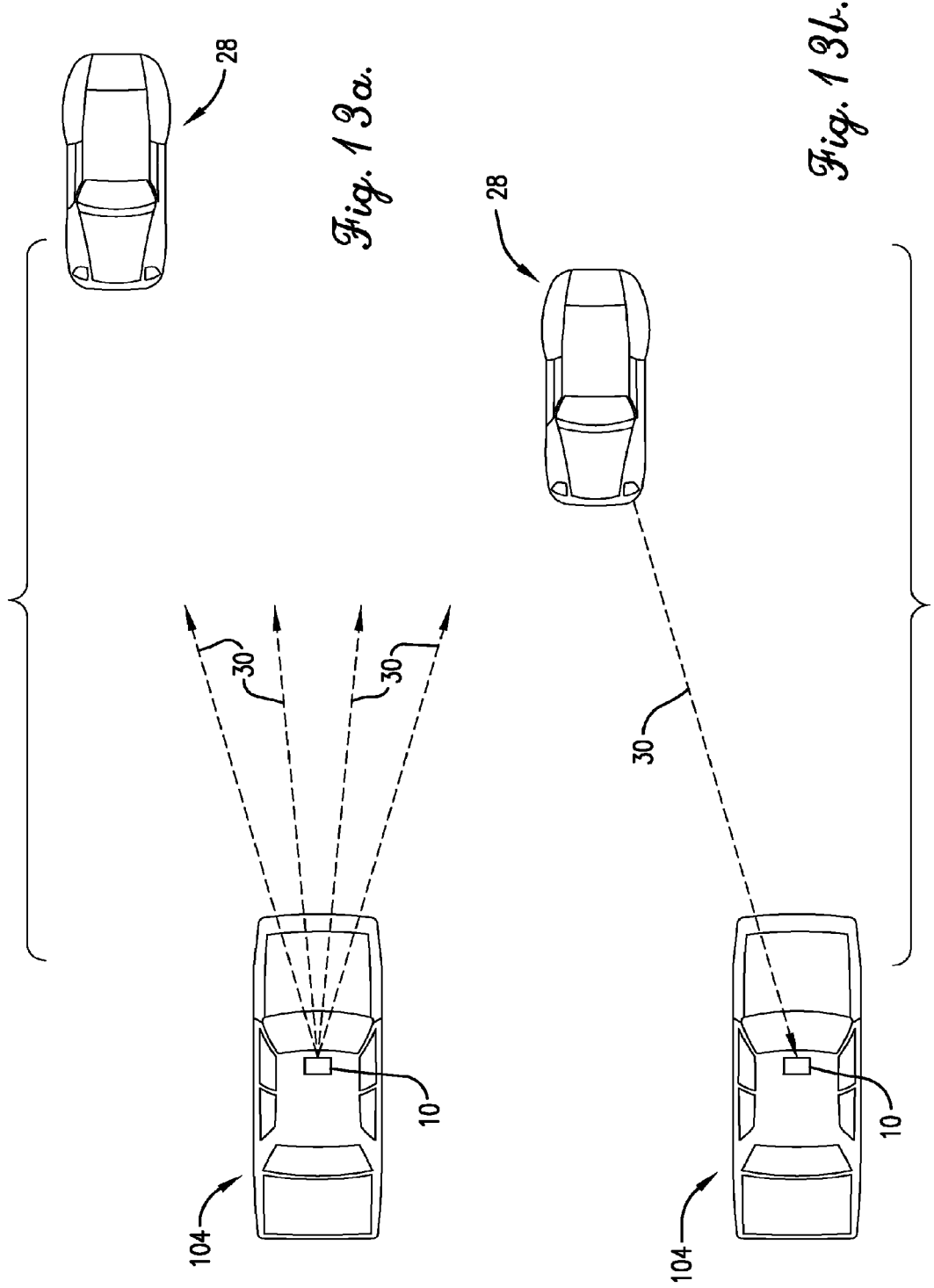

TRAFFIC SCANNING LIDAR

RELATED APPLICATIONS

The present application is a continuation patent application and claims priority benefit, with regard to all common subject matter, of earlier-filed U.S. patent application Ser. No. 13/085,994, entitled "TRAFFIC SCANNING LIDAR," filed Apr. 13, 2011, and issued Jan. 14, 2014, as U.S. Pat. No. 8,629,977 ("the '977 Patent"). The '977 Patent is a nonprovisional utility application and claims priority benefit, with regard to all common subject matter, of earlier-filed U.S. Provisional Patent Applications entitled "TRAFFIC SCANNING LIDAR", Ser. No. 61/324,083, filed Apr. 14, 2010, and "TRAFFIC SCANNING LIDAR", Ser. No. 61/405,805, filed Oct. 22, 2010. The identified earlier-filed patent and applications are hereby incorporated by reference into the present application in their entirety.

BACKGROUND OF THE INVENTION

1. Field of the Invention

The present invention relates to systems for monitoring vehicle velocities. More particularly, the invention relates to systems monitoring vehicle velocities using scanning light detection and ranging.

2. Description of the Related Art

Traffic control that includes monitoring the velocities of vehicles on the roadways may be implemented by law enforcement officers using various devices and systems, such as Doppler radar and LIDAR. Doppler radar operates in the microwave frequencies, typically X, K, and Ka band, and transmits a continuous or almost continuous wave and measures the speed of vehicles by receiving the reflected signal and using the Doppler principle. Typical Doppler radars can be operated from a stationary point or can be mounted in a law enforcement vehicle and operated while the law enforcement vehicle is moving. They are able to be used in a moving situation because the beamwidth is wide, typically 20 degrees, and therefore do not have to be pointed accurately at the vehicle being measured. But this feature is also a problem because when there are multiple vehicles in the beam, the operator does not know which vehicle is being measured. In the moving mode the Doppler radar subtracts out the speed of the law enforcement vehicle on which it is mounted.

Light detection and ranging (LIDAR) uses a laser pulse and determines the vehicle speed by performing distance time calculations based on the travel time of the reflected light pulse. Because the LIDAR has a very narrow beam, it is very selective of the vehicle being measured even when there are several vehicles within range. But this is also a disadvantage in its usage because the operator must carefully aim the LIDAR at the vehicle, and therefore, it can only effectively be used in stationary applications. The moving application has too much motion to keep it aimed properly.

SUMMARY OF THE INVENTION

Embodiments of the present invention solve the above-mentioned problems and provide a distinct advance in the art of systems for monitoring vehicle velocities. More particularly, embodiments of the invention provide a system that is operable to sweep a beam across a field of view at varying heights to detect the speed of a plurality of objects, such as motor vehicles, at the same time.

Embodiments of a system for detecting the speed and position of objects comprise a beam source, a transmit reflection device, a beam receiver, a receive reflection device, and a controller. The beam source may generate a beam. The transmit reflection device may reflect the beam at the objects and may include a plurality of transmit faces with at least a portion of the transmit faces oriented at a different angle and operable to reflect the beam at a different height. The beam receiver may detect the beam. The receive reflection device may include a plurality of receive faces with at least a portion of the receive faces oriented at a different angle and operable to focus the beam reflected from objects at different heights onto the beam receiver. The controller may determine the position of the objects over time and calculate the speed of the objects based on a change in the position of the objects.

Additional embodiments of a system for detecting the speed and position of objects comprise a beam source, a transmit device, a beam receiver, a receive device, and a controller. The beam source may generate a beam. The transmit device may sweep the beam at the objects through a known angle in the horizontal direction and a known angle in the vertical direction. The beam receiver may detect the beam. The receive device may focus the beam reflected from objects onto the beam receiver. The controller may determine the position of the objects over time and calculate the speed of the objects based on a change in the position of the objects.

Various embodiments of the present invention may include a transceiving reflection device for use with a light detection and ranging system. The transceiving reflection device comprises a transmit reflection device and a receive reflection device. The transmit reflection device may reflect a beam from a beam source into a space in which objects may be present and may include a transmit base, a transmit upper stage, and a plurality of transmit faces. The transmit upper stage may be spaced apart from and parallel to the transmit base. The transmit faces may be positioned in a circle between the transmit base and the transmit upper stage with at least a portion of the transmit faces oriented at a different angle therebetween. The receive reflection device may focus the beam onto a beam receiver and may include a receive base, a receive upper stage, and a plurality of receive faces. The receive base may be coupled to the transmit base. The receive upper stage may be spaced apart from and parallel to the receive base. The receive faces may be positioned in a circle between the receive base and the receive upper stage with at least a portion of the receive faces oriented at a different angle therebetween.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 11 is a sectional view of the transceiving reflection device;

FIG. 12 is a perspective view of an alternative embodiment of the transmit device and the receive device;

FIG. 13A is an overhead view of a law enforcement vehicle utilizing the system to determine the speed of objects on a roadway;

FIG. 13B is an overhead view of the law enforcement vehicle utilizing the system to determine the speed of objects on the roadway;

Figure 1:
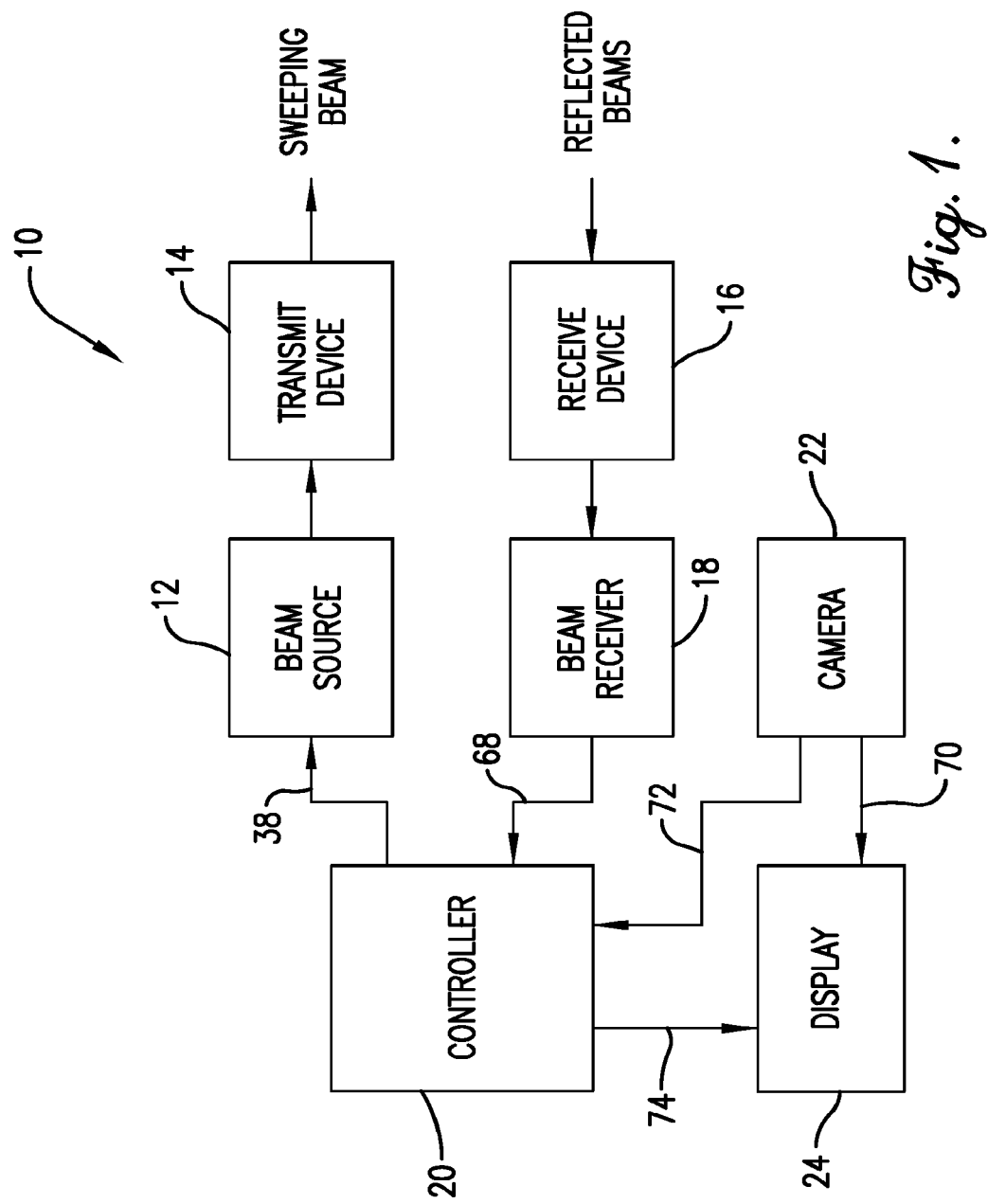
FIG. 1 is a block diagram of a system for determining the speed of objects constructed in accordance with various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention may provide a traffic scanning light detection and ranging (LIDAR) system 10, as shown in FIG. 1, that is operable to scan a field of view or a frame to determine the speeds of objects within the frame. The system 10 may broadly comprise a beam source 12, a transmit device 14, a receive device 16, a beam receiver 18, a controller 20, and a camera 22. The system 10 may optionally include a display 24. The system 10 may further include a housing 26 to house the system 10 excluding the display 24.

Figure 2:
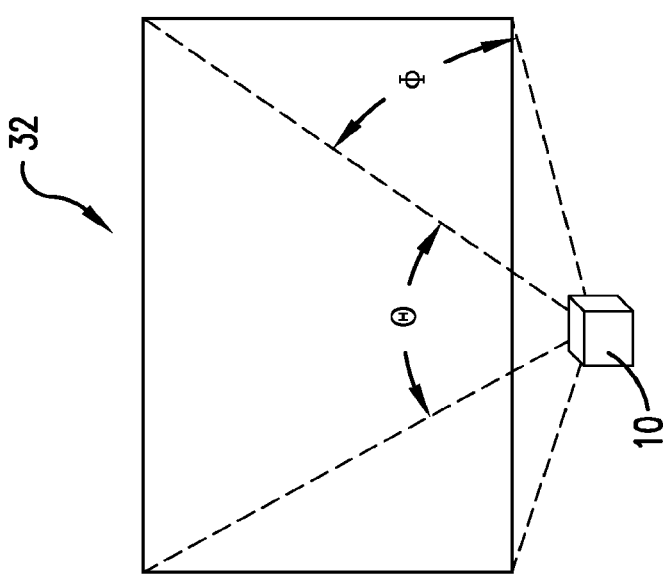
FIG. 2 is a diagram of a frame that is scanned by the system.
Figure 4:
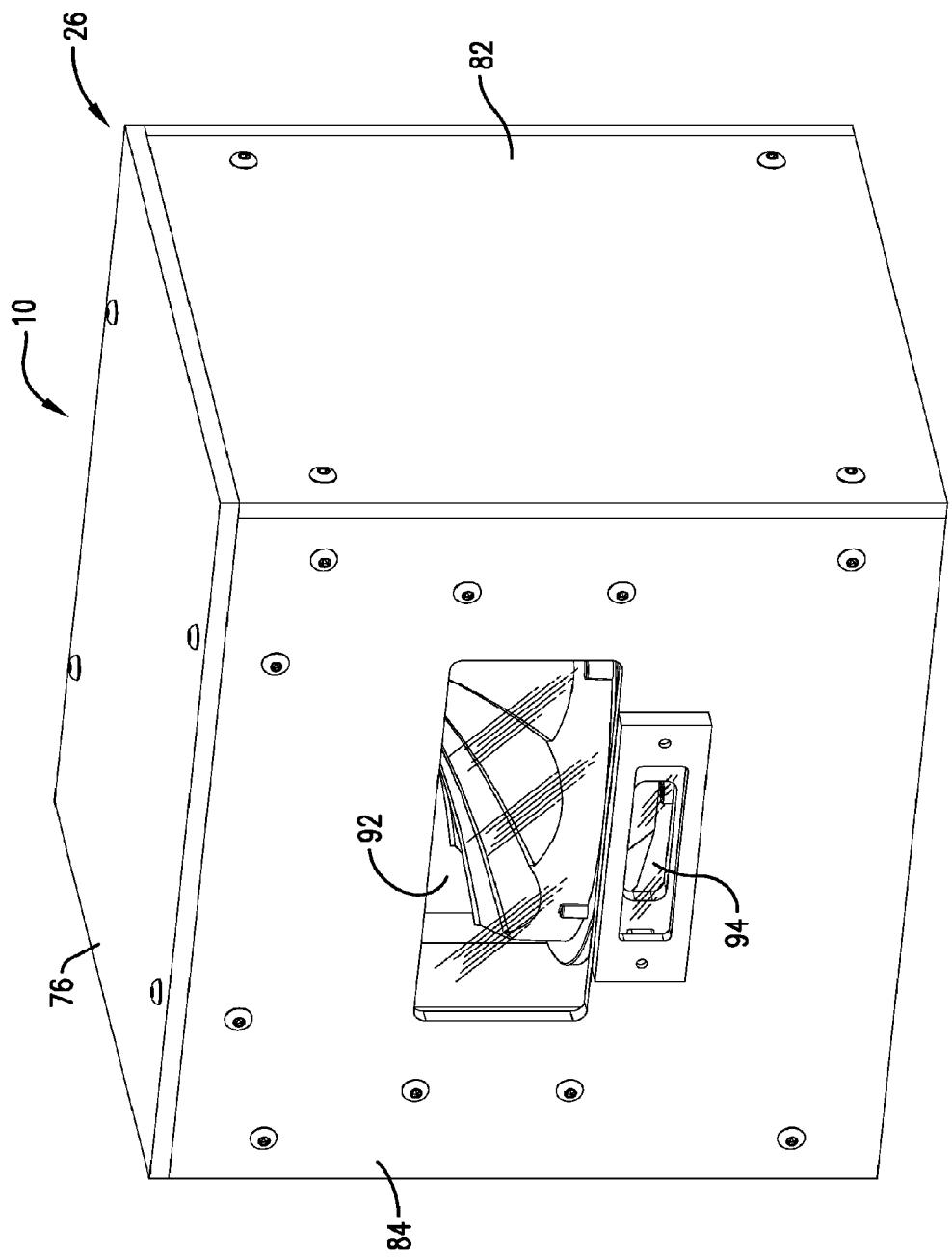
FIG. 4 is a perspective view of a housing operable to house at least a portion of the system.

The beam source 12 generally provides a source of electromagnetic (EM) radiation that is transmitted to at least one object 28, such as a motor vehicle as seen in FIGS. 13A-13B, and reflected back. Typically the radiation is swept or scanned over a space or a volume, such as a roadway setting, between the system 10 and the object 28 and may take the form of a directed beam 30. As used herein, a "sweep" may refer to the process of a beam 30 being moved, typically by rotation, through a given angle. The field of view of the scan or the data associated therewith may be referred to as a "frame" 32, as seen in FIG. 2, and may include a horizontal sweep angle $\theta$ and a vertical sweep angle $\phi$. In an exemplary frame 32, $\theta$ may range from approximately 24 degrees to approximately 45 degrees, approximately 25.7 degrees to approximately 36 degrees or may be approximately 28 degrees. $\phi$ may range from approximately 5 degrees to approximately 9 degrees, approximately 6 degrees to approximately 8 degrees or may be approximately 7 degrees.

Figure 5:
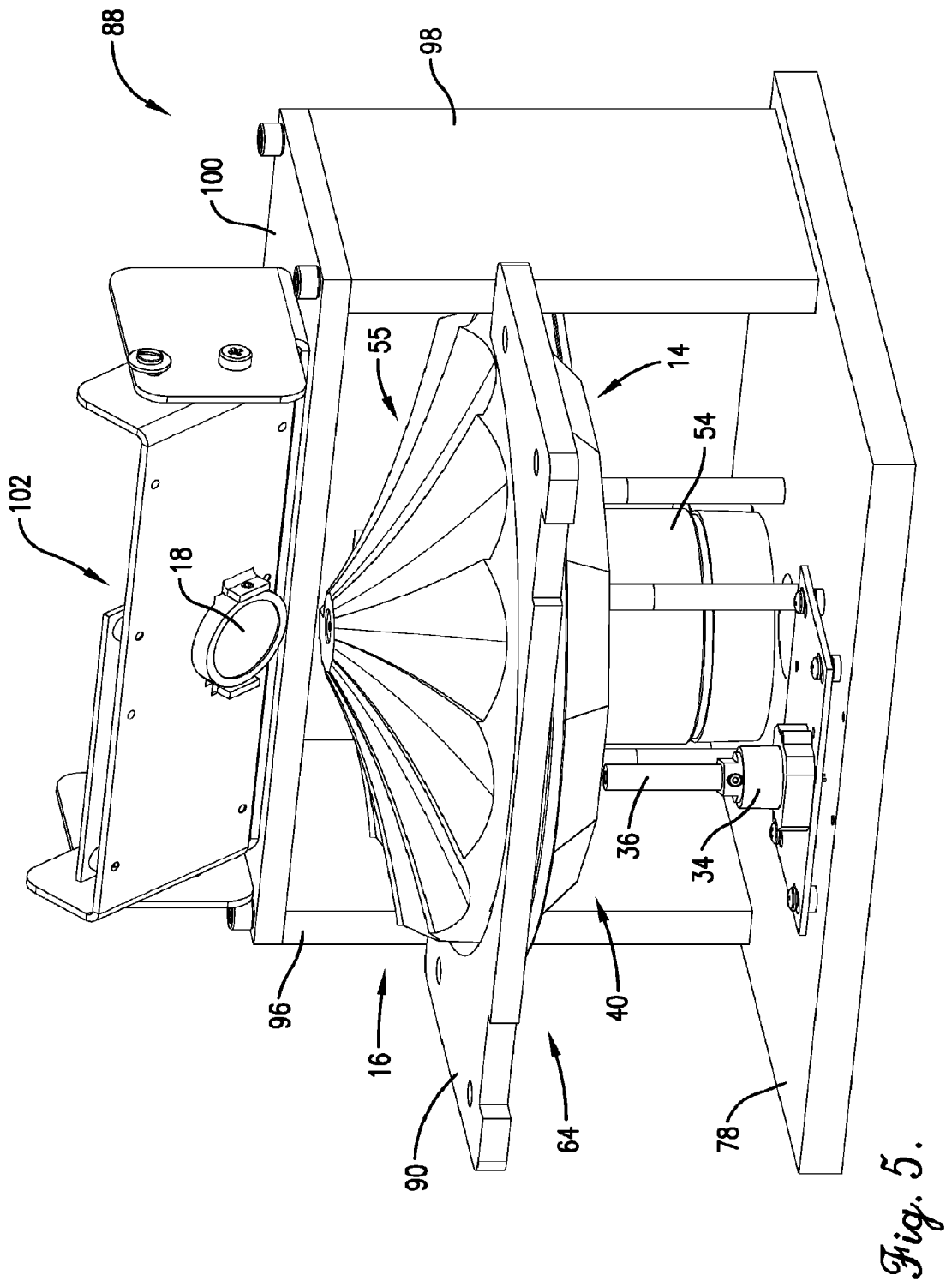
FIG. 5 is a perspective view of the system with the outer walls of the housing removed.

The beam source 12 may include a laser 34, as is known in the art, operable to generate the beam 30. In some embodiments, the beam source 12 may include a plurality of lasers that produce a plurality of beams 30. An exemplary laser 34 may be configured to produce a pulsed output with a power that ranges from approximately 50 watts (W) to approximately 100 W, approximately 70 W to approximately 80 W, or may be 75 W. Each pulse may have a period that ranges from approximately 5 nanoseconds (ns) to approximately 20 ns, approximately 7 ns to approximately 15 ns, or may be approximately 10 ns. The pulse repetition rate may range from approximately 50 kilohertz (kHz) to approximately 100 kHz, approximately 70 kHz to approximately 90 kHz, or may be approximately 80 kHz. The output of the laser 34 may be in the infrared (IR) range with a wavelength that ranges from approximately 700 nanometers (nm) to approximately 1400 nm, approximately 850 nm to approximately 950 nm, or may be approximately 905 nm. The beam divergence may range from approximately 0.05 degrees to approximately 0.15 degrees, approximately 0.07 degrees to approximately 0.12 degrees, or may be approximately 0.1 degrees in the horizontal direction. The beam divergence may range from approximately 0.5 degrees to approximately 1.5 degrees, approximately 0.7 degrees to approximately 1.2 degrees, or may be approximately 1 degree in the vertical direction. The beam source 12 may also include a collimating element 36, as shown in FIG. 5, which may collimate the output of the laser 34.

The system 10 may further include a beam source input 38 from the controller 20 to the beam source 12. The beam source input 38 may determine the operation of the beam source 12 such as energizing and de-energizing the beam 30, the width of the pulse, the power of the output, and the like.

The transmit device 14 generally directs or guides the beam 30 from the beam source 12 in order to perform a sweep. The transmit device 14 may sweep the beam 30 across the field of view frame 32 in the horizontal and vertical directions. The transmit device 14 may include optical components such as lenses, mirrors, beam splitters, prisms, and the like to perform actions on the beam source 12 output such as reflecting, refracting, diffracting, collimating, focusing, steering, and the like.

Figure 6:
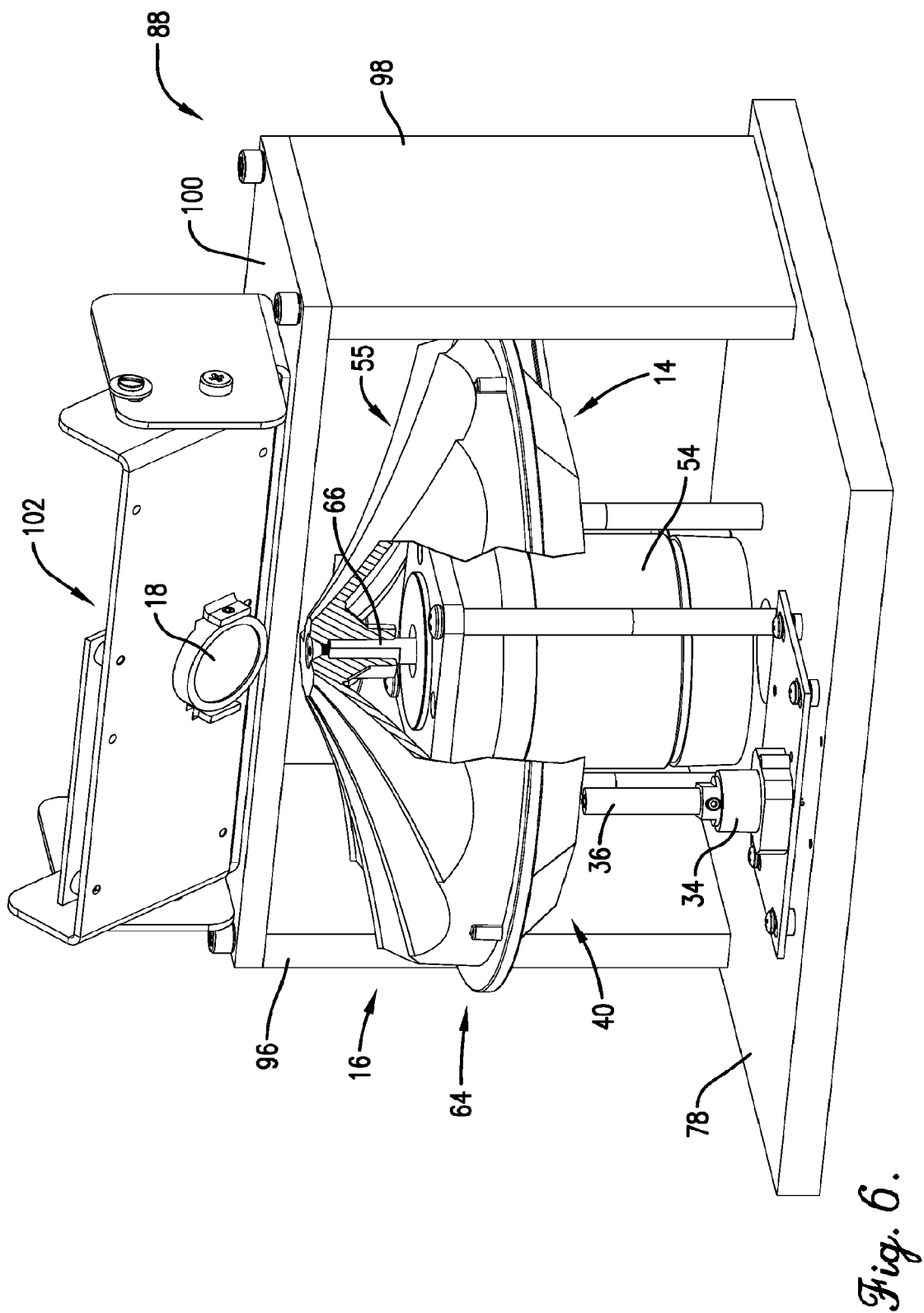
FIG. 6 is a perspective view of the system of FIG. 5 with a portion of a transceiving reflection device removed to expose its interior.
Figure 7:
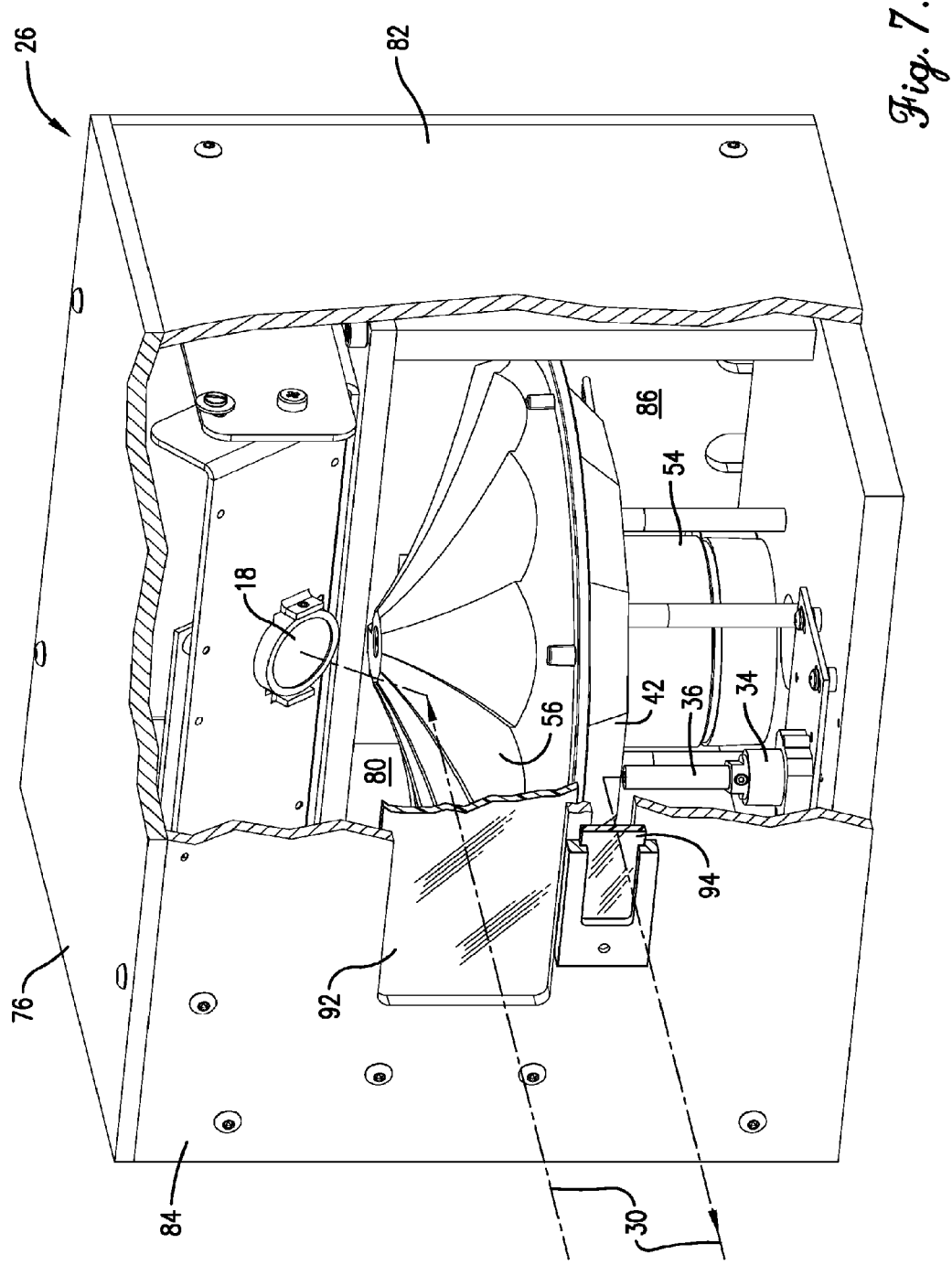
FIG. 7 is a perspective view of the housing with a portion of the exterior walls removed to illustrate the system transmitting and receiving the beam.

An exemplary embodiment of the transmit device 14 is shown in FIGS. 6-7, and may include a transmit reflection device 40 with a plurality of transmit faces 42. The transmit reflection device 40 may include a transmit base 44 and a spaced-apart transmit upper stage 46. The transmit base 44 may be planar and somewhat disc shaped. The transmit upper stage 46 may also be planar and somewhat disc shaped with a smaller diameter than the transmit base 44. The transmit base 44 and the transmit upper stage 46 may be roughly parallel with each other and have the centers aligned. Both the transmit base 44 and the transmit upper stage 46 may include central openings.

The transmit faces 42 may be generally rectangular in shape with a planar reflective surface. The transmit faces 42 may be located between the transmit base 44 and the transmit upper stage 46 around the circumference of the transmit base 44 and the transmit upper stage 46. In an exemplary embodiment, there may be twelve transmit faces 42 positioned adjacent one another between the transmit base 44 and the transmit upper stage 46. In alternative embodiments, there may be fewer or more transmit faces 42 depending on, among other things, the desired aspect ratio of the field of view frame 32. For example, fewer transmit faces 42 may generally lead to a wider and shorter frame 32, while more transmit faces 42 may generally lead to a narrower and taller frame 32.

Generally, at least a portion of the transmit faces 42 is oriented at a different angle. In the exemplary embodiment shown in the Figures, each transmit face 42 is oriented at a different angle. For example, the transmit faces 42 may be oriented at consecutively changing angles with respect to the transmit base 44 and the transmit upper stage 46. Specifically, the angle $\alpha$ between the transmit face 42 and the transmit upper stage 46, as seen in FIG. 11, may change. In general, the angle $\alpha$ for any of the transmit faces 42 may range from approximately 25 degrees to approximately 65 degrees, from approximately 30 degrees to approximately 60 degrees, or from approximately 40 degrees to approximately 50 degrees. For individual transmit faces 42, there may be a difference in the angle $\alpha$ between consecutive transmit faces 42 that ranges from approximately 0.25 degrees to approximately 0.5 degrees or may be approximately 0.375 degrees. Thus, the angle $\alpha$ for a first transmit face 42 may range from approximately 46.25 degrees to approximately 47.5 degrees or may be approximately 46.875 degrees. The angle $\alpha$ for a second transmit face 42 may range from approximately 46.0 degrees to approximately 47.0 degrees or may be approximately 46.500 degrees. The angle $\alpha$ for a twelfth transmit face 42 may range from approximately 42.0 degrees to approximately 43.5 degrees or may be approximately 42.750 degrees. The difference between consecutive transmit faces 42 may also influence the height of the frame 32. For example, a greater difference may generally lead to a greater height of the frame 32, while a lesser difference may generally lead to a shorter height of the frame 32.

The transmit reflection device 40 may be positioned in proximity to the beam source 12 such that the plane of the transmit base 44 and the transmit upper stage 46 is roughly perpendicular to the axis of the beam source 12. The beam 30 from the beam source 12 may strike the transmit faces 42 roughly in the center of each face 42. The transmit reflection device 40 may rotate about a central axis. As the transmit reflection device 40 rotates, the beam 30 may reflect off each of the transmit faces 42 in turn, creating one sweep for each transmit face 42. Since the transmit faces 42 are oriented at consecutively changing angles, the beam 30 is swept at a consecutively changing height within the frame 32 in order to create a raster scan.

Figure 3:
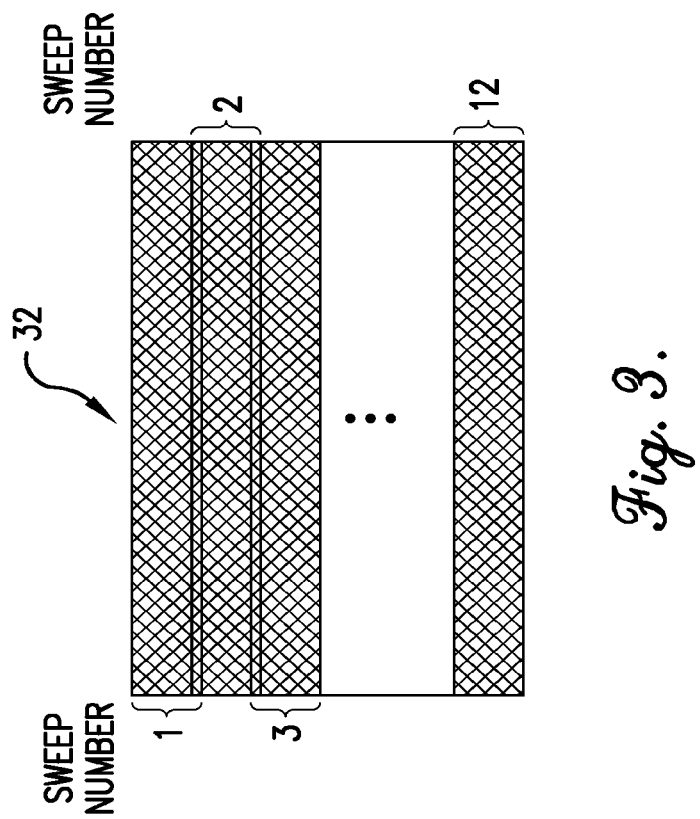
FIG. 3 is a diagram of the frame depicting the sweeping of a beam within the frame.

Referring to FIG. 3, the reflection of the beam 30 off the first transmit face 42 creates a sweep at the top of the frame 32. The reflection of the beam 30 off the second transmit face 42 creates a sweep just below the first sweep. The reflection of the beam 30 off the third transmit face 42 creates a sweep just below the second sweep. This process continues until the beam 30 is reflected off the twelfth transmit face 42, and the transmit reflection device 40 has completed one rotation. As the transmit reflection device 40 continues to rotate, the beam 30 is reflected off the first transmit face 42 again and the beam is swept across the top of the frame 32. The beam 30 may sweep from the bottom of the frame 32 to the top of the frame 32, depending on the direction of rotation of the transmit reflection device 40 and the order in which the transmit faces 42 are positioned within the transmit reflection device 40.

In an exemplary embodiment of the system 10, the transmit reflection device 40 is rotated at a speed such that the beam 30 is swept to provide 20 frames per second.

As can be seen in FIG. 3, the beam 30 overlaps itself on consecutive sweeps from consecutive transmit faces 42 in the vertical direction within the frame 32. In other words, a portion of one sweep may overlap a portion of the next sweep. For example, the lower portion of the first sweep may overlap the upper portion of the second sweep. The lower portion of the second sweep may overlap the upper portion of the third sweep. The overlap may continue until the twelfth sweep, wherein only the upper portion of the twelfth sweep overlaps the lower portion of the eleventh sweep. Then, the next transmit face 42 is the first transmit face 42, that generates the first sweep across the top of the frame 32. The overlap helps to ensure that the frame 32 is completely scanned and that no objects 28 are missed because of a gap between sweeps.

The transmit reflection device 40 may be formed from lightweight materials such as lightweight metals or plastics. The transmit faces 42 may be formed from reflective materials. Exemplary transmit faces 42 may have a reflectivity of greater than 97%. In some embodiments, the transmit reflection device 40 may be formed from separate transmit faces 42 that are joined to the transmit base 44 and the transmit upper stage 46. However, in an exemplary embodiment, the transmit reflection device 40, including the transmit base 44, the transmit upper stage 46, and the transmit faces 42, is formed as a monolithic single unit from a plastic, perhaps injection molded, that is coated with a reflective material such as gold or silver.

The transmit device 14 may alternatively be implemented with a prism assembly that refracts the beam 30 instead of reflecting it. A first exemplary prism assembly is a Risley prism assembly 48 that comprises a first wedge prism 50 and a second wedge prism 52, as seen in FIG. 12. With a beam 30 directed at the Risley prism assembly 48, the first wedge prism 50 may be rotated at a greater rotational frequency than the second wedge prism 52. This rotation scheme may result in a spiral-shaped sweeping pattern being formed. Thus, the frame 32 may have a circular shape rather than a rectangular shape. Alternatively, the Risley prism assembly 48 may be directed to sweep the beam 30 in a criss-cross pattern or a lemniscate pattern.

A second exemplary prism assembly is similar to the Risley prism assembly 48 of FIG. 12 and includes a third wedge prism with a smaller deflection angle than the first and second wedge prisms 50, 52. In this embodiment, the first and second wedge prisms 50, 52 may rotate in opposite directions to each other and at the same speed. In the absence of the third prism, the two prisms 50, 52 may receive the beam 30 directed at one of the prisms 50, 52 and refract the beam 30 to form a horizontal line sweep. The third prism may be positioned adjacent to and in line with the first and second wedge prisms 50, 52 such that the third prism receives the beam output from the first two prisms 50, 52. The third prism may be rotated to refract the beam 30 in the vertical direction. Thus, while the first and second prisms 50, 52 are rotating at a constant speed, the third prism may be stationary while the beam 30 performs a full horizontal sweep at a first height. Then, the third prism may rotate through a fixed angle and stop while the beam 30 performs a full horizontal sweep at a second height, different from the first. The third prism may rotate again and stop while the beam 30 performs a full horizontal sweep at a third height, different from the second. This process may repeat while the beam 30 sweeps at different heights to scan a full frame 32. Alternatively, the third prism may be rotated at a very slow speed compared to the rotation of the first and second prisms 50, 52.

The system 10 may also include a motor 54 to rotate the transmit reflection device 40. The motor 54 may include alternating current (AC), direct current (DC), stepper motors, and the like. An exemplary motor 54 may include a 36-Volt (V) brushless DC motor capable of rotating from 0 to 4,000 revolutions per minute (rpm).

The receive device 16 generally guides the beams 30 reflected from one or more objects 28 toward the beam receiver 18. The receive device 16 may, in various embodiments, include optical components such as lenses, lenslets, lens arrays, focal plane arrays, mirrors, beam splitters, prisms, and the like to perform actions on the reflected beams 30 such as focusing, reflecting, refracting, diffracting, steering, and generally guiding the beams 30 to the beam receiver 18.

Figure 8:
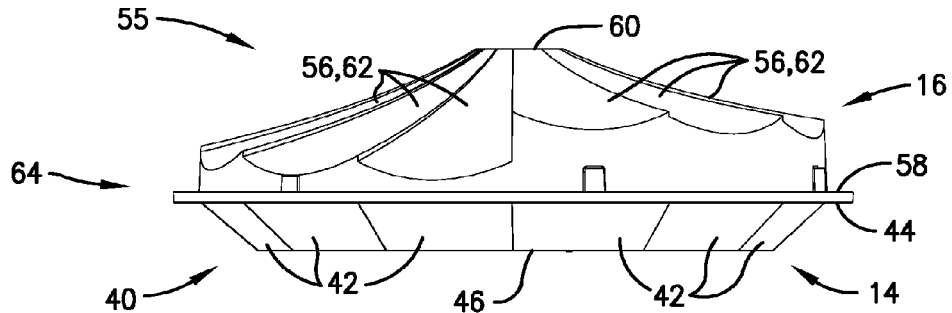
FIG. 8 is a front view of the transceiving reflection device including a transmit reflection device and a receive reflection device.
Figure 9:
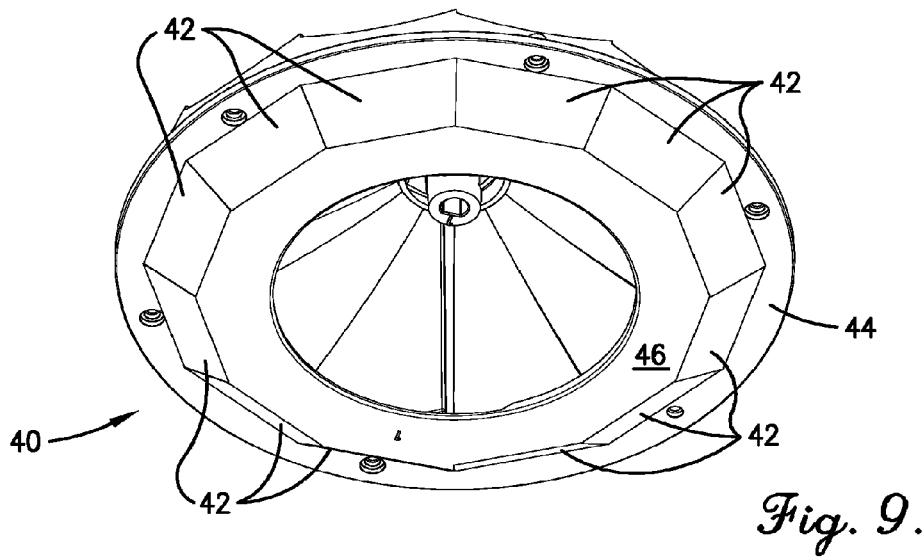
FIG. 9 is a perspective view of a transmit device including the transmit reflection device.
Figure 10:
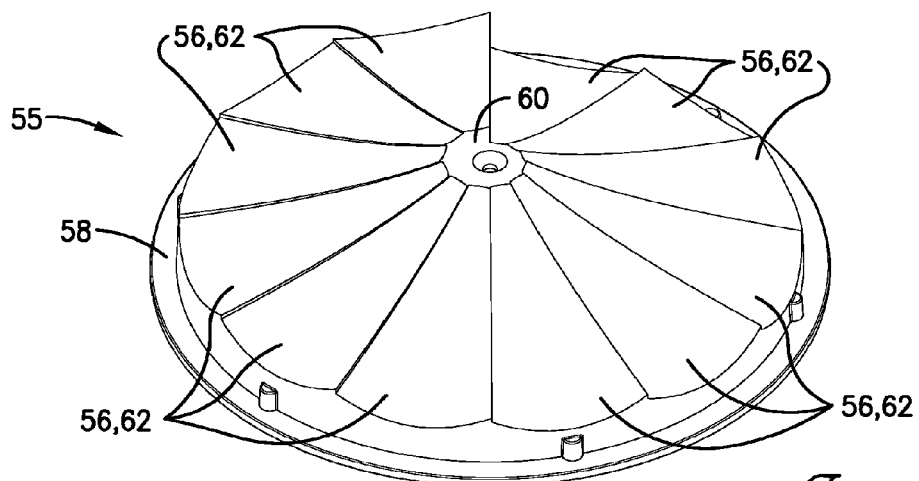
FIG. 10 is a perspective view of a receive device including the receive reflection device.

An exemplary embodiment of the receive device 16 is shown in FIGS. 8 and 10, and may include a receive reflection device 55 with a plurality of receive faces 56, a planar disc-shaped receive base 58 with a central opening, and a spaced-apart receive upper stage 60. The receive faces 56 may be generally wedge-shaped and positioned adjacent one another between the receive base 58 and the receive upper stage 60. In the exemplary embodiment of FIGS. 8 and 10, there may be twelve receive faces 56 used with the receive reflection device 55. Generally, the number of receive faces 56 matches the number of transmit faces 42.

Each receive face 56 may include an outer surface 62 with the shape of a partial circular paraboloid. As a geometric shape, the circular paraboloid has the property of reflecting rays that strike the paraboloid surface with a trajectory that is parallel to the central axis to a focal point within the paraboloid. Thus, the receive faces 56 may be used to reflect beams 30 to a focal point FP, as seen in FIG. 11. The beams 30 may be those that were transmitted from the beam source 12 and reflected off objects 28 such as motor vehicles. The focal point for the beams 30 may be the beam receiver 18, discussed in more detail below.

Generally, at least a portion of the receive faces 56 is oriented at a different angle. In the exemplary embodiment shown in the Figures, each receive face 56 is oriented at a different angle. For example, the outer surface 62 of each receive face 56 may be oriented at consecutively changing angles with respect to the receive base 58. Specifically, the angle β between the central axis CA of the partial circular paraboloid of each receive face 56 and a vertical axis VA that is perpendicular to the receive base 58, as seen in FIG. 11, may change. In general, the angle β for any of the receive faces 56 may range from approximately 60 degrees to approximately 120 degrees, from approximately 75 degrees to approximately 105 degrees, or from approximately 80 degrees to approximately 100 degrees. For individual receive faces 56, there may be a difference in the angle β between consecutive receive faces 56 that ranges from approximately 0.5 degrees to approximately 1 degree or may be approximately 0.75 degrees. Thus, the angle β for a first receive face 56 may range from approximately 85.0 degrees to approximately 87.5 degrees or may be approximately 86.25 degrees. The angle β for a second receive face 56 may range from approximately 86.0 degrees to approximately 88.0 degrees or may be approximately 87.00 degrees. The angle β for a twelfth receive face 56 may range from approximately 93.0 degrees to approximately 96.0 degrees or may be approximately 94.50 degrees. The change in the angle β for consecutive receive faces 56 may correspond to the change in the angle α for consecutive transmit faces 42. In various embodiments, the change in angle β may be a multiple of the change in the angle α.

In operation, the receive reflection device 55 may rotate. During rotation, each receive face 56 may focus beams 30 reflected from objects 28 at varying angles of rotation. Furthermore, each consecutive receive face 56 may focus beams 30 reflected from objects 28 at varying angles with respect to the horizontal plane. For example, depending on the direction of rotation of the receive reflection device 55, the receive faces 56 may focus beams 30 reflected from objects 28 increasingly lower in the frame 32 or increasingly higher in the frame 32. This operation of the receive reflection device 55 creates a raster scan for the received beams 30.

The receive device 16 may alternatively be implemented with a Risley prism assembly 48 shown in FIG. 12. Beams 30 may be reflected from objects 28 in the roadway to the second prism 52 and travel through the assembly 48 to a beam splitter (not shown). The beam 30 is then reflected from the beam splitter to the beam receiver 18.

Like the transmit reflection device 40, the receive reflection device 55 may be formed from lightweight materials such as lightweight metals or plastics, and the receive faces 56 may be formed from reflective materials. Exemplary receive faces 56 may have a reflectivity of greater than 97%. In some embodiments, the receive reflection device 55 may be formed from separate receive faces 56 that are joined to the receive base 58. However, in an exemplary embodiment, the receive reflection device 55, including the receive base 58 and the receive faces 56, is formed as a monolithic single unit from a plastic, perhaps injection molded, that is coated with a reflective material such as gold or silver.

In some embodiments, the receive reflection device 55 may coupled to the transmit reflection device 40, such that the receive base 58 of the receive reflection device 55 is connected to the transmit base 44 and the transmit faces 42 are positioned opposite of and vertically aligned with the receive faces 56. The combination of the receive reflection device 55 and the transmit reflection device 40 may form a transceiving reflection device 64. In the exemplary embodiment of FIGS. 5-10, the transmit reflection device 40 and the receive reflection device 55 are formed as a monolithic single unit from a metallic-coated plastic. In addition, the first receive face 56 is aligned with the first transmit face 42, the second receive face 56 is aligned with the second transmit face 42, and so forth, such that the twelfth receive face 56 is aligned with the twelfth transmit face 42.

The motor 54 utilized for rotating the transmit reflection device 40 may also be used to rotate the receive reflection device 55. The motor 54 may be positioned within the openings of the transmit upper stage 46 and the transmit base 44 and the opening in the base of the receive reflection device 55. The motor 54 may include a shaft 66 that is coupled to the receive upper stage 60 of the receive reflection device 55, such that when the shaft 66 rotates, both the transmit reflection device 40 and the receive reflection device 55 rotate as well.

The beam receiver 18 generally receives the reflected beams 30 that have been focused by the receive faces 56. The beam receiver 18 may include devices or arrays of devices that are sensitive to IR radiation, such as charge-coupled devices (CCDs) or complementary metal-oxide semiconductor (CMOS) sensor arrays, photodetectors, photocells, phototransistors, photoresistors, photodiodes, or combinations thereof. In an exemplary embodiment, the beam receiver 18 includes a silicon avalanche photodiode with a peak sensitivity at 905 nm, a bandwidth of 905 nm ±40 nm, an active area of 2 mm×2 mm, and a current gain of 200. The photodiode may be coupled to a receiver circuit with a gain of $10^6$, an operational frequency range of 1 megahertz (MHz) to 100 MHz, and a comparator output.

The beam receiver 18 may positioned in proximity to the receive reflection device 55 at the focal point of the receive faces 56. The beam receiver 18 may include a beam receiver output 68 that provides information corresponding to the reflected beams 30 to the controller 20.

The controller 20 may execute computer programs, software, code, instructions, algorithms, applications, or firmware, and combinations thereof. The controller 20 may include processors, microprocessors, microcontrollers, field-programmable gate arrays (FPGAs), application-specific integrated circuits (ASICs), combinations thereof, and the like, and may be implemented using hardware description languages (HDLs), such as Verilog and VHDL. The controller 20 may further include data storage components, which may comprise "computer-readable media" capable of storing the computer programs, software, code, instructions, algorithms, applications, or firmware. The computer-readable media may include random-access memory (RAM) such as static RAM (SRAM) or dynamic RAM (DRAM), cache memory, read-only memory (ROM), flash memory, hard-disk drives, compact disc ROM (CDROM), digital video disc (DVD), or Blu-Ray™, combinations thereof, and the like.

In an exemplary embodiment, the controller 20 includes a Kinetis K10 microcontroller manufactured by Freescale of Austin, Tex., and an OMAP™ 4 microprocessor manufactured by Texas Instruments of Dallas, Tex. Some of the functions that the microcontroller handles include sending a control signal to the beam source 12 and sending a control signal to the motor 54. Some of the functions that the microprocessor handles include sending video information to the display 24, processing the received beam 30 information, and calculating the speed of objects 28 within the frame 32.

The controller 20 may further include a timer circuit that is operable to measure the time of flight of the beam 30 or pulses of the beam 30. The timer may start when a pulse of the beam 30 is transmitted from the beam source 12 and may stop when the pulse of the beam 30 is received by the beam receiver 18.

In addition, the controller 20 may include an accelerometer or may receive the output of an external accelerometer to determine the motion of a vehicle in which the system 10 is implemented. The controller 20 may also receive the pulse train output of the transmission of the vehicle.

In various embodiments, the controller 20 may be aware of the angle at which the transceiving reflection device 40 is rotating. Thus, the controller 20 may be aware of which transmit face 42 is reflecting the beam 30 and which receive face 56 is focusing beams 30 onto the beam receiver 18. Furthermore, the controller 20 may be aware of the horizontal sweep angle θ and the vertical sweep angle φ the beam 30 is being reflected from the transmit reflection device 40.

In some embodiments, the controller 20 may also receive MPEG4-encoded data from the camera 22 and may determine velocity vector information regarding objects 28 within the frame 32 based on the MPEG4 data.

The system 10 may further include components not shown in the figures such as inputs, outputs, and communication ports. Inputs may include knobs, dials, switches, keypads, keyboards, mice, joysticks, combinations thereof, and the like. Outputs may include audio speakers, lights, dials, meters, printers, combinations thereof, and the like. Communication ports may be wired or wireless, electronic, optical, radio frequency (RF), combinations thereof, and the like.

The camera 22 generally provides an image of the space or volume that the system 10 is scanning. An exemplary camera 22 may be a 1080p high-definition camera capable of capturing 30 fps. The camera 22 may include a camera output 70 that communicates video data to the display 24. In some embodiments, the camera 22 may include an MPEG4 codec, as is known in the art, to generate MPEG4-encoded data that may be communicated to the controller 20 via a camera data output 72.

The display 24 generally displays the video image from the camera 22 as well as information from the controller 20 regarding objects in the image. The display 24 may include video monitors as are known in the art capable of displaying moving or still video images in addition to text or graphical data within the same frame. Examples of the display 24 may include cathode ray tubes (CRTs), plasma monitors, liquid crystal display (LCD) monitors, light-emitting diode (LED) monitors, LED-LCD monitors, combinations thereof, and the like.

In embodiments wherein the system 10 does not include the display 24, the system 10 may send data on a display output 74 to an external display or monitor.

The housing 26 may be of cubic or rectangular box shape with six walls: a top wall 76, a bottom wall 78, a left side wall 80, a right side wall 82, a front wall 84, and a rear wall 86 that are coupled together in a typical box construction. The housing 26 may further include an internal frame 88 and an optical isolation plate 90. The housing 26 may be constructed from plastics or lightweight metals, such as aluminum.

The camera 22 may be positioned on the exterior of the housing 26, such as mounted on the exterior of the front wall 84 or the exterior of the top wall 76. In other embodiments, the camera 22 may be positioned within the housing 26 adjacent a window or opening through which the camera 22 captures video images. In still other embodiments, the camera 22 may be positioned external to the housing 26.

The motor 54 may be mounted on the bottom wall 78 close to the center thereof. Thus, the transmit reflection device 40 may face the bottom wall 78, while the receive reflection device 55 faces the top wall 76. The beam source 12 may also be mounted on the bottom wall 78 in proximity to the front wall 84, such that the collimating element 36 is aligned with one of the transmit faces 42.

The front wall 84 may include a receive window 92 and a transmit window 94, both of which may be filled with a material, such as glass or glass-like material, that is transparent to electromagnetic radiation at a wavelength that ranges from approximately 700 nm to approximately 1400 nm, approximately 850 nm to approximately 950 nm, or may be approximately 905 nm. The receive window 92 may be positioned in proximity to the receive reflection device 55 such that it is aligned with the receive faces 56. Beams 30 may reflect off objects 28 into the receive window 92 and may be focused by the receive faces 56 onto the beam receiver 18, as shown in FIGS. 7 and 11. The transmit window 94 may be positioned in proximity to the transmit reflection device 40 such that it is aligned with the transmit faces 42. The beam source 12 may generate the beam 30 that reflects off the transmit faces 42 and travels through the transmit window 94.

The internal frame 88 may include a first upright wall member 96 in proximity to the left side wall 80 and a second upright wall member 98 in proximity to the right side wall 82, both of which are coupled to the bottom wall 78. The frame 32 may also include a cross beam 100 coupled to the upper edges of the first and second upright wall members 96, 98. The frame 32 may further include a mounting assembly 102 coupled to the cross beam 100 and to which the beam receiver 18 is mounted. The mounting assembly 102 may be adjustable about one or more axes in order to position the beam receiver 18 at the focal point of the partial circular paraboloid of the receive faces 56.

The optical isolation plate 90 may be positioned within the housing along a horizontal plane at a level just above the receive base 58 of the receive reflection device 55. First, second, and third sides of the optical isolation plate 90 may couple to the left side wall 80, the front wall 84, and the right side wall 82, respectively. A fourth side includes a circular cutout that is slightly smaller than the circumference of the receive base 58 of the receive reflection device 55. Thus, the cutout of the optical isolation plate 90 is positioned between the edge of the receive base 58 and the receive faces 56. Since the optical isolation plate 90 overlaps the receive base 58, the plate 90 acts as a shield to prevent stray radiation from the beam source 12 being detected by the beam receiver 18.

The system 10 is generally implemented in a law enforcement vehicle 104, and the housing 26 may be mounted on the dashboard with access to an open field of view. In various embodiments, the housing 26 may be mounted on the exterior of the vehicle 104, such as on the roof. In some embodiments, the camera 22 may be mounted on the exterior of the vehicle 104 as well.

The system 10 may operate as follows. Referring to FIG. 13A, the system 10, mounted in the law enforcement vehicle 104, may scan the field generally toward the front of the vehicle 104 for objects 28, such as other vehicles. The controller 20 may send a signal to the beam source 12 and the motor 54 to initiate a scan of the field of view frame 32. Generally, once the system 10 is energized, the frame 32 is scanned repeatedly, such that when one frame 32 is scanned, another frame 32 begins scanning automatically.

Given a command from the controller 20, the beam source 12 generates a beam 30 that may have the power and pulse characteristics as described above. Also given a command from the controller 20, the motor 54 rotates the transmit reflection device 40. The beam 30 from the beam source 12 may reflect off one of the transmit faces 42 and travel through the transmit window 94 to the roadway or landscape in front of the law enforcement vehicle 104. As the transmit reflection device 40 rotates, the transmit faces 42 rotate as well. Rotation of a transmit face 42 while it is reflecting a beam 30 causes the beam 30 to sweep in the horizontal direction across the field of view frame 32. The beam 30 may sweep from right to left or left to right depending on the direction of rotation of the transmit reflection device 40. Once the edge of one transmit face 42 rotates beyond the beam 30 from the beam source 12, the next transmit face 42 reflects the beam 30 horizontally in the same direction as the previous transmit face 42 did. The current transmit face 42 may sweep the beam 30 across the frame 32 at a different height from the previous transmit face 42. Depending on the order in which the transmit faces 42 are positioned on the transmit reflection device 40 or the direction of rotation of the transmit reflection device 40, the beam 30 reflected from the current transmit face 42 may sweep higher or lower in the frame 32 than the beam 30 from the previous transmit face 42.

While the beams 30 are transmitted from the system 10 to the roadway in front of the law enforcement vehicle 104, one or more beams 30 may be reflected off of objects 28, as seen in FIG. 13B. The objects 28 may be moving or stationary, on the road and off of the road. In addition, the law enforcement vehicle 104 and, in turn, the system 10 may be stationary or in motion.

As the beams 30 are reflected back to the system 10, the beams 30 may be focused by the receive reflection device 55 to the beam receiver 18. Since the receive base 58 of the receive reflection device 55 is coupled to the transmit base 44, the two devices 16, 40 rotate at the same speed. In addition, the angle at which each receive face 56 is oriented corresponds to the angle at which the vertically-aligned transmit face 42 is oriented. For example, the transmit face 42 that sweeps the beam 30 along the lowest horizontal path of the frame 32 is aligned with the receive face 56 that is oriented to focus beams 30 reflected from objects located along the lowest horizontal path of the frame 32. Likewise, the transmit face 42 that sweeps the beam 30 along the highest horizontal path of the frame 32 is aligned with the receive face 56 that is oriented to focus beams 30 reflected from objects located along the highest horizontal path of the frame 32.

The controller may use the timer circuit to determine the time of flight of pulses of the reflected beams 30 received by the beam receiver 18. Given the time of flight of the pulse and the speed of the pulse (roughly the speed of light), the distance to the object 28 from which the pulse of the beam 30 was reflected can be calculated. Furthermore, the controller 20 may determine the horizontal sweep angle θ at which the pulse of the beam 30 was transmitted from the transmit reflection device 40. The controller 20 may assume that the pulse is reflected off an object 28 at the same angle it was transmitted. As a result, for each pulse of the beam 30 received by the beam receiver 18, the controller 20 determines the distance that the pulse traveled and the angle θ at which the pulse was reflected. Thus, the controller 20 may record the data for each received pulse in terms of polar coordinates where the radius is the distance to the object 28 from which the pulse was reflected and the angle is the angle θ at which the pulse was reflected. The controller 20 may ignore data relating to pulses that are received near the horizontal edges of the frame 32, because that is where the beam 30 was transitioning from one transmit face 42 to the next transmit face 42 and the pulses may not be received properly at the edges of the frame 32.

The controller 20 may perform a plurality of calculations in order to calculate the speed of objects 28 moving in the roadway in front of the law enforcement vehicle 104. The results of the calculations may be represented in FIGS. 14-19. The controller 20 may not necessarily communicate the results of the calculations to the display 24 or other monitor. However, the results are shown as graphs in the Figures to help illustrate the operation of the controller 20.

Figure 14:
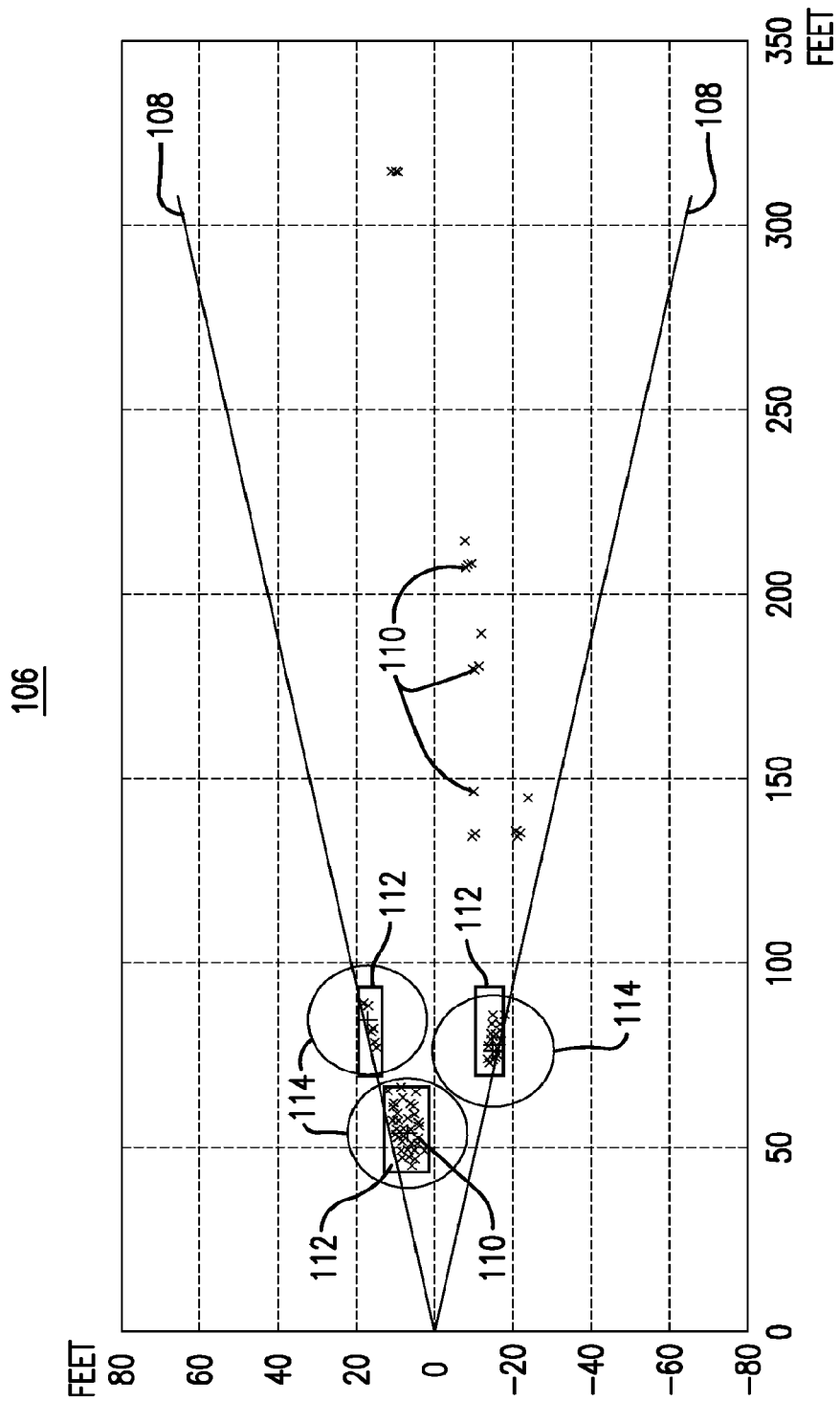
FIG. 14 is a graph of raw data from beams that are reflected by objects and received by the system.

The controller 20 may convert the data relating to received pulses of the beam 30 from polar coordinates to rectangular Cartesian coordinates, as shown in graph 106 of FIG. 14. Graph 106 depicts an overhead view of the roadway and the field of view of the system 10. The housing 26 of the system 10 may be located at coordinates (0, 0) of graph 106. Plotted along the y-axis is the distance to the left (positive y direction) and to the right (negative y direction) from the housing 26 given in units of feet. Plotted along the x-axis is the distance away from the housing 26 in front of the law enforcement vehicle 104 given in units of feet. The V-shaped lines 108 represent the boundaries of the sweep of the beam 30. Received pulses of the beam 30 are raw data points 110 plotted on graph 106 with a lower case x. In graph 106, a plurality of pulses are plotted that were received over a short period of time—perhaps one second.

Also shown in graph 106 are boxes 112 and circles 114 around clusters of points 110 detected to be objects 28, as described in greater detail below. The sides of the box 112 may be drawn at the extents of the object 28. The circle 114 may be drawn with its center located at the median or the mean of the points 110 of the object 28.

Figure 15:
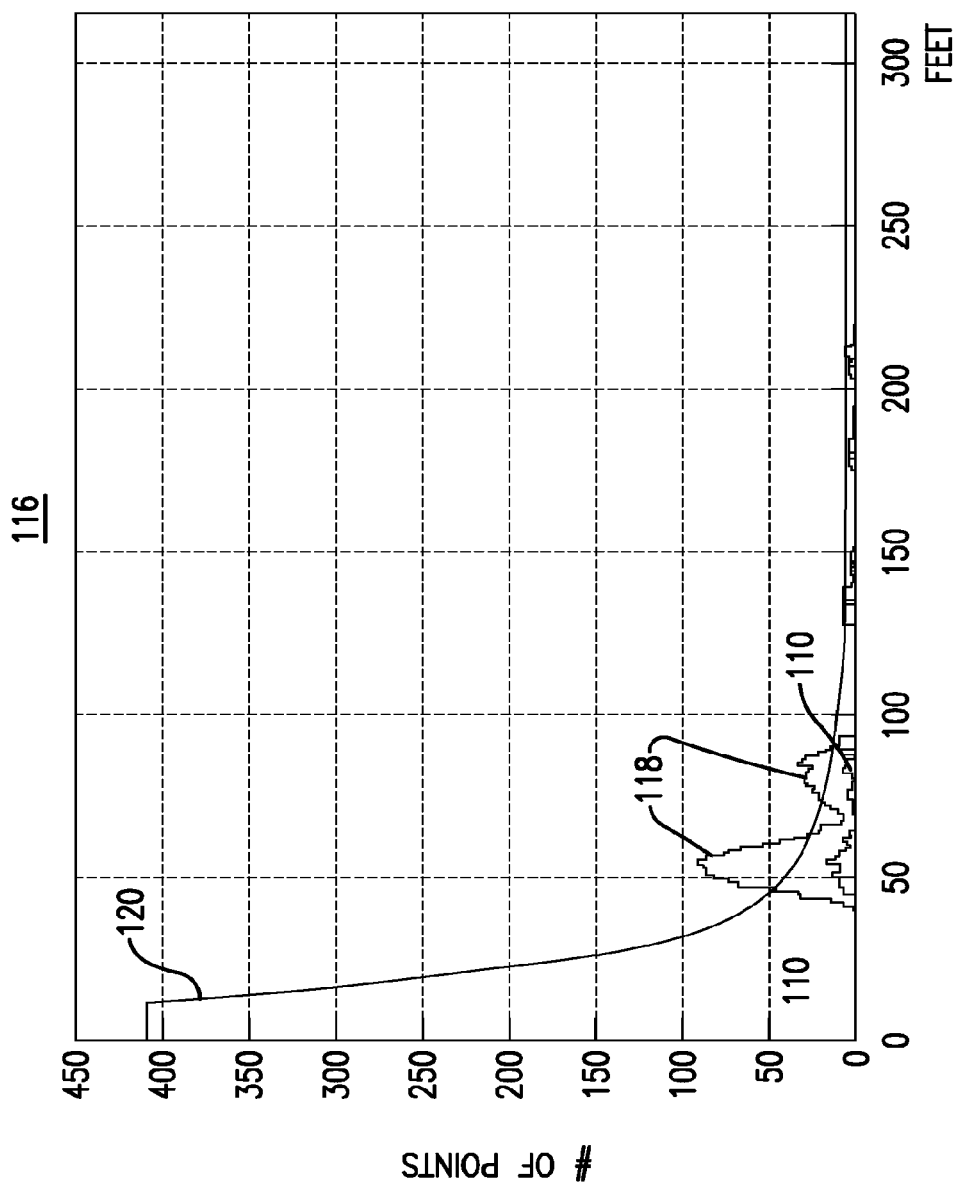
FIG. 15 is a graph of a histogram of beams received versus distance from the system.
Figure 17:
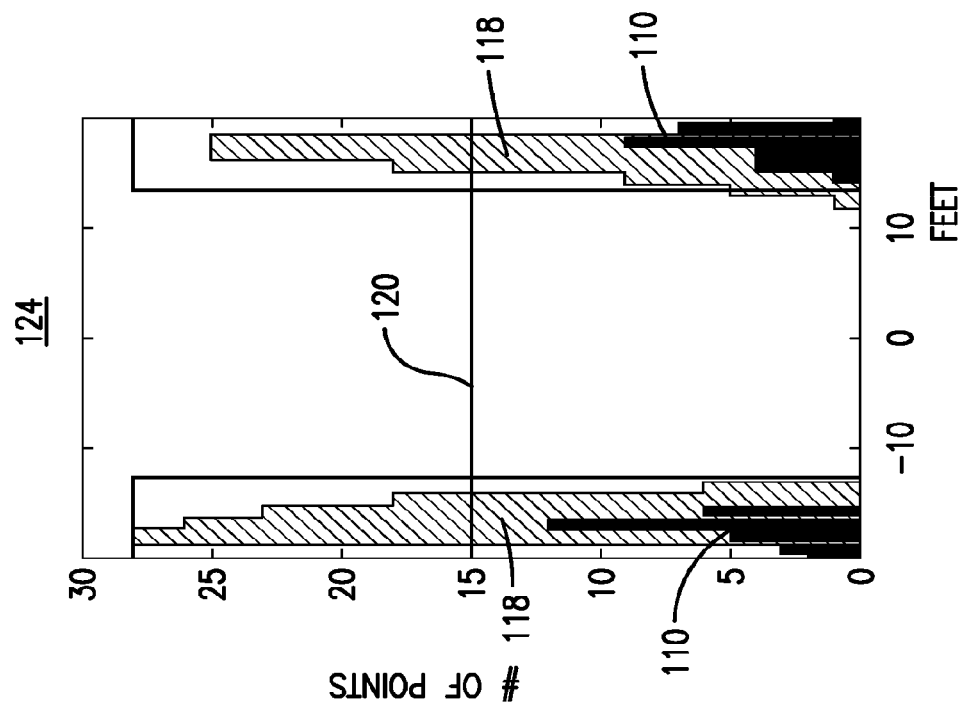
FIG. 17 is a graph of a histogram of beams received from a potential second object.
Figure 16:
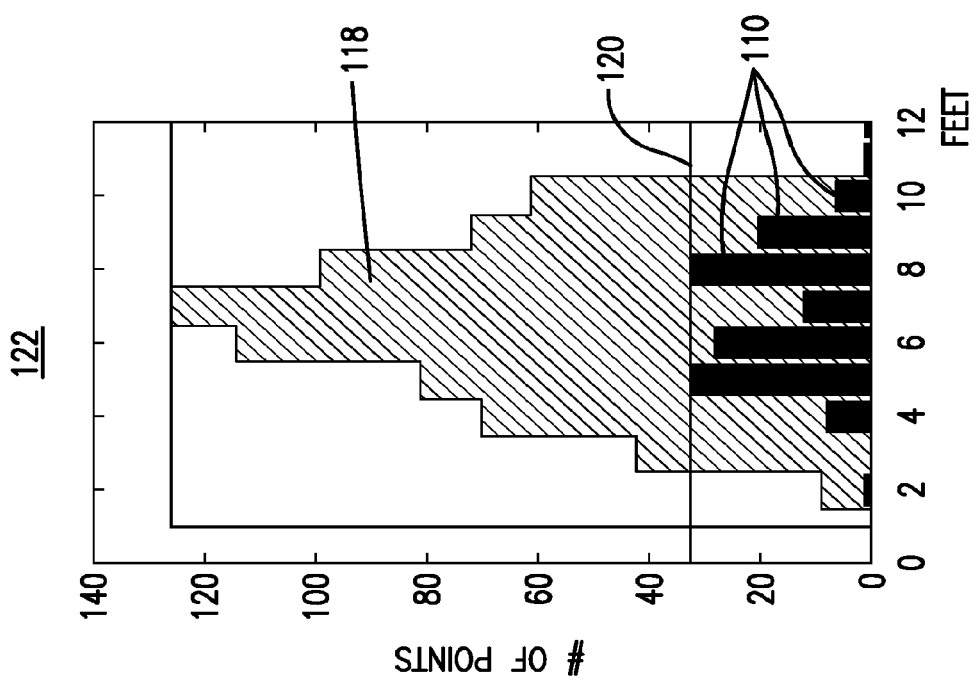
FIG. 16 is a graph of a histogram of beams received from a potential first object.
Figure 19:
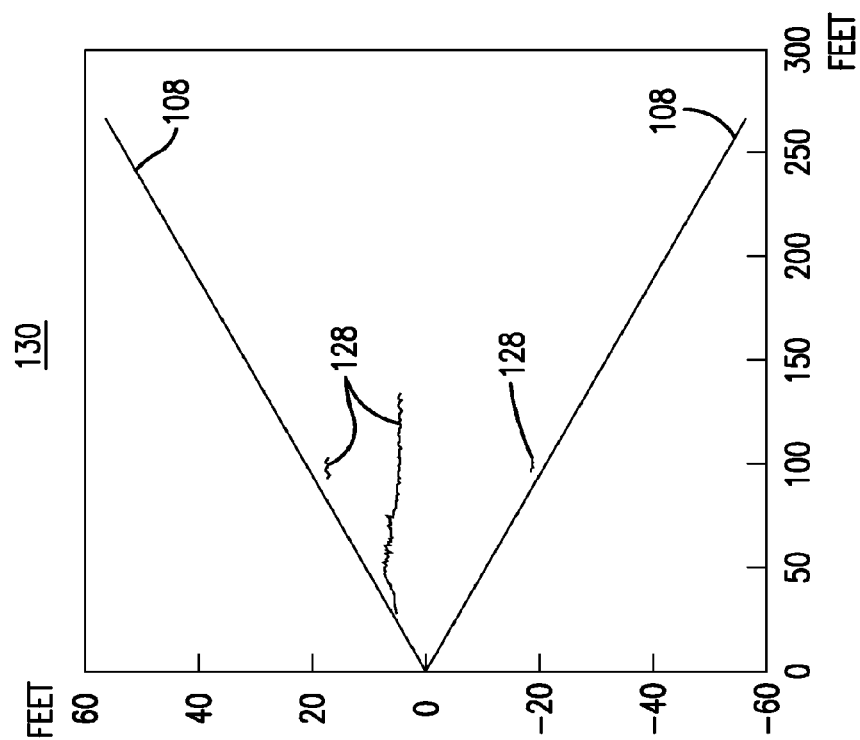
FIG. 19 is a graph of the position of potential objects over time.
Figure 18:
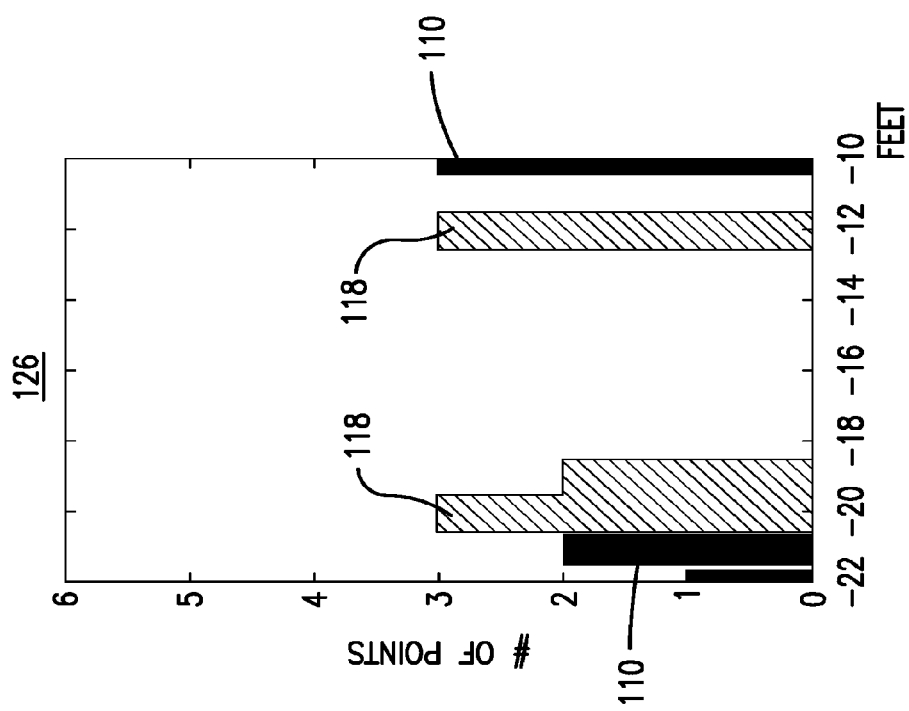
FIG. 18 is a graph of a histogram of beams received from a potential third object.

In order to determine where objects 28 are in the plot of graph 106, the controller 20 may sort the points 110 by distance from the housing 26, as shown in the histogram plot of graph 116 in FIG. 15. Along the y-axis of graph 116 is plotted the number of points 110 received. Along the x-axis is plotted the distance from the housing 26. As seen from graph 106 of FIG. 15, there is a large number of points 110 from the distance of about 45 feet to the distance of about 70 feet. There is a smaller number of points 110 from the distance of about 75 feet to about 90 feet. There are very small amounts of points 110 occurring at greater distances from the housing 26. All the points 110 shown in graph 106 are plotted in graph 116 as the number of points 110 occurring at each distance away from the housing 26.

To enhance the detection of objects 28, a second set of points 118 may also be calculated and plotted. The second set of points 118 is, for each distance, the sum of the number of points 110 for two feet on either side of the distance. The value of two feet may be variable for other embodiments. For example, if the number of points 110 at consecutive distances is given by: 8 feet=4 points, 9 feet=3 points, 10 feet=6 points, 11 feet=5 points, and 12 feet=4 points. A second point 118 for the distance of 10 feet would be the sum of the points 110 for 8 feet to 12 feet=4+3+6+5+4. Thus, a second point 118 for 10 feet=22.

A threshold 120 is also applied to the second set of points 118, as seen in graph 116. The threshold 120 may have a constant value at a given number of points. In the example of graph 116, the constant value occurs at approximately 410. The threshold 120 may also include an exponential decay that approaches an asymptote of zero points. For every group of points 118 that crosses the threshold 120, there may be one or more objects 28.

To determine the number of objects 28 and the width of each object 28 at a certain distance, the controller 20 may sort the points 118 by distance from the center at the certain distance from the housing 26. Thus, everywhere that there is a peak of the points 118 that crosses the threshold 120, the controller 20 may sort the points 118 at the peak. In the example plot of graph 116, there are two peaks (a first at about 55 feet and a second at about 80 feet) where the points 118 cross the threshold 120. There is a third peak at about 135 feet where the threshold 120 is almost crossed. The distribution of points 118 at the three peaks are plotted as histograms in graphs 122, 124, 126 shown in FIGS. 16, 17, and 18 respectively.

The distribution of both sets of points 110, 118 at a distance of approximately 55 feet from the housing 26 is plotted in graph 122. For reference, it can be seen in graph 106 that at a distance along the x-axis of about 55 feet, there is a plurality of points 110 positioned from about 4 feet to about 10 feet in the y direction. The raw data points 110 are plotted in graph 122 from 4 feet to 10 feet along the x-axis. The second set of enhanced data points 118 is also plotted in graph 122. The threshold 120, with a value of approximately 35, is plotted as well. Thus, it appears from graph 122 that there is only one object at the distance of about 55 feet.

The distribution of both sets of points 110, 118 at a distance of approximately 80 feet from the housing 26 is plotted in graph 124. Similar to graph 122 discussed above, for reference, it can be seen in graph 106 that at a distance along the x-axis of about 80 feet, there is a first plurality of points 110 positioned from about 14 feet to about 20 feet in the y direction. There is a second plurality of points 110 from about 12 feet to about 18 feet in the negative y direction. These points 110 are plotted in graph 124, showing one set of points 110 between −18 and −12 and a second set of points 110 between 14 and 20. The second set of enhanced data points 118 is also plotted in graph 124. In addition, the threshold 120, with a value of approximately 15, is plotted. Thus, it can be seen that there are two objects 28 spaced about 25 feet apart at a distance of about 80 feet from the housing 26.

The third peak from graph 116 is plotted in graph 126. As can be seen in graph 106, at approximately 135 feet from the housing, there is a small number of points 110 at about 10 feet and about 22 feet in the negative y direction. The raw data points 110 are plotted in graph 126 along with the second set of enhanced points 118. As can be seen, the points 118 fail to cross the threshold 120 of about 5.5. Thus, there is likely not an object 28 of any interest at a distance of about 135 feet from the housing 26.

Once objects 28 are detected, the controller 20 may track them. For every object 28 that is detected, the controller 20 may create a track 128. The track 128 represents the xy position of the median of points 110 that were determined to be an object 28 from graphs 122, 124 discussed above. A plot of tracks 128 is shown in graph 130 of FIG. 19. Graph 130 is similar to graph 106 in that it shows an overhead view of the roadway in front of the housing 26 which may be mounted in a law enforcement vehicle 104. The lines 108 show the boundaries of the sweep of the beam 30. Three tracks 128 are shown in graph 130 that correspond to the three objects 28 of graph 106. The tracks 128 that are shown were recorded over a period of time of a few seconds. Since the tracks 128 represent the distance traveled by each object 28 and the period of time is known, then the speed of each object 28 can be calculated as the distance divided by the time. As can be seen, the upper and lower tracks 128 of graph 130 do not cover much distance, and thus their speeds are near zero. But, the middle track 128 travels a certain distance and has a non-zero speed.

To determine the actual speed of the objects 28, the controller 20 may receive data from an accelerometer or from the pulse train of the transmission of the law enforcement vehicle 104 to detect whether the vehicle 104 is moving. If the law enforcement vehicle 104 is moving, then the controller 20 may add or subtract the speed of the vehicle 104, as appropriate, to determine the actual speed of each object 28. If the law enforcement vehicle 104 is stationary, then the speed calculated from the steps above is the actual speed.

Once the controller 20 has determined the speed of the objects 28 in the frame 32, the controller 20 may communicate the speed information to the display 24. The display 24 may show an image from the camera 22 that depicts the field of view of the camera 22, which is generally the same as the frame 32 that is being scanned by the system 10. The display 24 may also show the speed data from the controller 20, such that objects 28 on the display 24 have an associated speed. For example, a car may be seen on the display 24 with a box, a crosshair, or similar icon superimposed over the car with the speed of the car displayed nearby. The speed and the position of the icon may be updated as the object 28 moves. Alternatively or in addition, the display 24 may have a split screen wherein the image from the camera 22 occupies one portion of the screen and a data information area occupies another portion of the screen. The image portion may still include an indicator of the speed of each car in motion. The data information portion may also list the speeds of objects 28 as well as additional information on the objects 28 or the system 10. The display 24 may further include touchscreen capabilities that allow the user to touch the screen to issue commands to the system 10 or retrieve more information.

The traffic scanning LIDAR system 10 described herein offers a distinct advantage over prior art LIDAR systems. Prior art LIDAR systems aim a beam at a single target and measure the difference between the time of flight of consecutive pulses. This approach measures the relative speed at which the target is moving toward or away from the LIDAR source. The relative speed measured is the actual speed of the target if the target is traveling on a path directly to or from the LIDAR source. If the target is traveling on a path away from the LIDAR source then the measured speed is less than the actual speed of the target. This inaccuracy is known as the "cosine effect" or the "cosine error". The current system 10 avoids the cosine error because the controller 20 is aware of the angle at which pulses are being reflected from objects 28 (targets). Thus, the current system 10 can track the actual path of the object 28, not just the path relative to the beam source 12. Determining the actual path of the object 28 results in calculating the actual speed of the object 28.

An additional advantage of the current system 10 over prior art systems is that the current system 10 sweeps a beam 30 repeatedly over a field of view frame 32 and can therefore track a plurality of objects 28 simultaneously. Prior art systems are generally not capable of sweeping a beam and are thus limited to tracking a single object 28.

The current system 10 is also capable of being used in other applications. The system 10 could be utilized in marine environments for speed detection or navigation. The system 10 could also be utilized in robotic applications for intelligent guidance and navigation of self-propelled robots or robotic machinery. Furthermore, the system 10 could be in the automotive or other vehicle industries for intelligent collision-avoidance systems.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A system for determining the position and speed of a plurality of objects within a field of view, the system comprising:
   a beam source operable to generate a beam;
   a transmit reflection device operable to reflect the beam at the plurality of objects, the transmit reflection device including a plurality of transmit faces, at least a portion of the transmit faces oriented at a different angle and operable to reflect the beam at a different height,
   wherein the beam reflection off each transmit face creates a sweep;
   wherein the transmit reflection device further includes a disc-shaped base and a disc-shape upper stage spaced apart from and of a smaller diameter than the base, the plurality of transmit faces being positioned in a circle between the upper stage and the base at an angle therebetween;
   a beam receiver operable to detect the beam;
   a receive reflection device including a plurality of receive faces, at least a portion of the receive faces oriented at a different angle and operable to focus the beam reflected from the plurality of objects at different heights onto the beam receiver; and
   a controller operable to (1) repeatedly perform a plurality of sweeps within the field of view to track each of the plurality of objects within the field of view, and (2) determine the position of each of the plurality of objects over time and calculate the speed of each of the plurality of objects based on a change in the position of the objects.

2. The system of claim 1, wherein the transmit faces are oriented at consecutively varying angles from a first transmit face to a last transmit face to reflect the beam at consecutively varying heights.

3. The system of claim 2, wherein the angle of each transmit face changes by the same amount for consecutively positioned transmit faces.

4. The system of claim 2, wherein each transmit face is oriented at an angle different from each of the other transmit faces.

5. The system of claim 1, wherein the transmit reflection device is rotatable about a central axis such that the beam reflects off each transmit face in turn as the transmit reflection device rotates to create said sweep.

6. The system of claim 5, wherein the sweep reflected from a first transmit face to a last transmit face overlap one another.

7. The system of claim 1, wherein each receive face includes an outer surface with a shape operable to focus beams reflecting from the plurality of objects.

8. The system of claim 7, wherein the shape of the outer surface of each receive face is a partial circular paraboloid.

9. The system of claim 1, wherein the receive reflection device further includes a disc-shaped base and a disc-shaped upper stage spaced apart from and of a smaller diameter than the base, the receive faces being positioned in a circle between the upper stage and the base at an angle therebetween and the angle changes by the same amount for consecutively positioned receive faces.

10. The system of claim 9, wherein the receive reflection device is rotatable about a central axis of the base and the upper stage, such that each receive face focuses beams at different heights as the receive reflection device rotates.

11. A system for determining the position and speed of an object within a field of view, the system comprising:
   a beam source operable to generate a beam;
   a transmit reflection device operable to reflect the beam at the object,
   wherein each transmit reflection device includes a plurality of transmit faces,
   wherein each transmit face is oriented at an angle, wherein at least a first portion of the transmit faces is oriented at a different angle than a second portion of the transmit faces, such that the first portion of the transmit faces is operable to reflect the beam at a different height than the second portion of the transmit faces, wherein the transmit reflection device is rotatable about a central axis such that the beam reflects off each transmit face in turn as the transmit reflection device rotates, and the beam reflection off each transmit face creates a sweep, wherein the sweep reflected from a first transmit face to a last transmit face overlap one another;

a beam receiver operable to detect the beam;

a receive reflection device including a plurality of receive faces, wherein each receive face is oriented at an angle, wherein at least a first portion of the receive faces is oriented at an angle corresponding to the angle at which the first portion of the transmit faces is oriented, and a second portion of the receive faces is oriented at an angle corresponding to the angle at which the second portion of transmit faces is oriented, such that the receive reflection device is operable to focus the beam reflected from the plurality of objects at different heights onto the beam receiver, wherein the receive reflection device is rotatable about a central axis of the base and the upper stage, such that each receive face focuses beams at different heights as the receive reflection device rotates; and a controller operable to determine the position of the object over time and calculate the speed of the object based on a change in the position of the object.

12. The system of claim 11, wherein the transmit faces are oriented at consecutively varying angles from the first transmit face to the last transmit face to reflect the beam at consecutively varying heights.

13. The system of claim 12, wherein the angle of each transmit face changes by the same amount for consecutively positioned transmit faces.

14. The system of claim 12, wherein each transmit face is oriented at an angle different from each of the other transmit faces.

15. The system of claim 11, wherein each receive face includes an outer surface with a partial circular paraboloid shape operable to focus beams reflecting from the plurality of objects.

16. A method for determining the position and speed of an object within a field of view, the method comprising the steps of:

generating a beam;

projecting the beam towards a transmit reflection device operable to reflect the beam at the object, wherein said transmit reflection device includes a plurality of transmit faces, wherein each transmit face is oriented at an angle, and at least a first portion of the transmit faces is oriented at an angle different from an angle of orientation of a second portion of the transmit faces;

receiving, at a receive reflection device having a plurality of receive faces and wherein at least a portion of the received faces is oriented at a different angle, the beam reflected by the transmit reflection device;

focusing the beam received at the receive reflection device at different heights onto a beam receiver;

detecting a reflection of the beam at different heights dependent on the transmit face off of which the beam reflected;

generating a sweep of the object by rotating the transmit faces as the beam is projected towards the object;

repeatedly generating a plurality of sweeps within the field of view to track the object within the field of view;

determining the position of the object over time based on the plurality of generated sweeps; and calculating the speed of the object based on a change in the position of the object.

17. The method of claim 16, wherein a portion of each sweep reflected from a first transmit faces to a last transmit face overlaps the sweeps adjacent thereto.

18. The method of claim 17, wherein the transmit faces are oriented at consecutively varying angles from a first transmit face to a last transmit face to reflect the beam at consecutively varying heights, and wherein the angle of each transmit face changes by the same amount for consecutively positioned transmit faces.

19. A system for determining the position and speed of a plurality of objects within a field of view, the system comprising:

a beam source operable to generate a beam;

a transmit reflection device operable to reflect the beam at the plurality of objects, the transmit reflection device including a plurality of transmit faces, at least a portion of the transmit faces oriented at a different angle and operable to reflect the beam different height, wherein the reflection off each transmit face creates a sweep;

a beam receiver operable to detect the beam;

a receive reflection device including a plurality of receive faces, at least a portion of the receive faces oriented at a different angle and operable to focus the beam reflected from the plurality of objects at different heights onto the beam receiver, wherein the receive reflection device further includes a disc-shaped base and a disc-shaped upper stage spaced apart from and of a smaller diameter than the base, the receive faces being positioned in a circle between the upper stage and the base at an angle therebetween and the angle changes by the same amount for consecutively positioned receive faces; and a controller operable to (1) repeatedly perform a plurality of sweeps within the field of view to track each of the plurality of objects within the field of view, and (2) determine the position of each of the plurality of objects over time and calculate the speed of each of the plurality of objects based on a change in the position of the objects.

20. The system of claim 19, wherein the transmit faces are oriented at consecutively varying angles from a first transmit face to a last transmit face to reflect the beam at consecutively varying heights, wherein the angle of each transmit face changes by the same amount for consecutively positioned transmit faces, wherein each transmit face is oriented at an angle different from each of the other transmit faces.

21. The system of claim 19, wherein each receive face includes an outer surface with a shape operable to focus beams reflecting from the plurality of objects, wherein the shape of the outer surface of each receive face is a partial circular paraboloid.

22. The system of claim 19, wherein the receive reflection device is rotatable about a central axis of the base and the upper stage, such that each receive face focuses beams at different heights as the receive reflection device rotates.

23. The system of claim 19, wherein the transmit reflection device further includes a disc-shaped base and a disc-shaped upper stage spaced apart from and of a smaller diameter than the base, the plurality of transmit faces being positioned in a circle between the upper stage and the base at an angle therebetween.

24. The system of claim 23,
wherein the transmit reflection device is rotatable about a central axis such that the beam reflects off each transmit face in turn as the transmit reflection device rotates to create said sweep,
wherein the sweep reflected from the first transmit face to the last transmit face overlap one another.

* * * * *